(12) United States Patent
Klein et al.

(10) Patent No.: US 9,218,093 B2
(45) Date of Patent: Dec. 22, 2015

(54) TOUCH SENSOR DRIVER WITH SELECTABLE CHARGE SOURCE

(75) Inventors: Hans Klein, Pleasanton, CA (US); Edward Grivna, Brooklyn Park, MN (US); Daniel O'Keeffe, Whitechurch (IE)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 369 days.

(21) Appl. No.: 13/536,255

(22) Filed: Jun. 28, 2012

(65) Prior Publication Data

US 2013/0241630 A1  Sep. 19, 2013

Related U.S. Application Data

(60) Provisional application No. 61/612,166, filed on Mar. 16, 2012.

(51) Int. Cl.
*G06F 3/041* (2006.01)
*G06F 3/044* (2006.01)

(52) U.S. Cl.
CPC ..................... *G06F 3/044* (2013.01)

(58) Field of Classification Search
CPC .................................. G06F 3/044
USPC ......................... 345/156, 173–178
See application file for complete search history.

(56) References Cited

U.S. PATENT DOCUMENTS

| 6,980,581 | B1 | 12/2005 | Sha et al. |
| 2001/0025913 | A1 | 10/2001 | Tanimoto |
| 2004/0238726 | A1 | 12/2004 | Caldwell |
| 2005/0168255 | A1 | 8/2005 | Gauthier et al. |
| 2006/0262101 | A1 | 11/2006 | Layton et al. |
| 2007/0171696 | A1* | 7/2007 | Dray et al. .................... 365/145 |
| 2008/0142352 | A1 | 6/2008 | Wright |
| 2008/0272657 | A1 | 11/2008 | Hull et al. |
| 2009/0016085 | A1* | 1/2009 | Rader et al. ..................... 363/79 |
| 2009/0256815 | A1 | 10/2009 | Westerinen |
| 2010/0045635 | A1 | 2/2010 | Soo |
| 2010/0085326 | A1 | 4/2010 | Anno |
| 2010/0110040 | A1 | 5/2010 | Kim |
| 2011/0025629 | A1* | 2/2011 | Grivna et al. ................. 345/173 |

(Continued)

FOREIGN PATENT DOCUMENTS

JP        10293195 A    11/1998
WO     2010136932 A1   12/2010

OTHER PUBLICATIONS

Ik-Seok Yang, "A touch controller using differential sensing method for on-cell capacitive touch screen panel systems", Consumer Electronics, Aug. 2011, 1027-1032, vol. 57, Issue 3, Dept of Electron. Eng., Hanyang Univ. In Seoul, South Korea.
Atmel, "Touchscreen Controllers", http://www.atmel.com/products/touchsolutions/touchscreens/default.aspx, Jun. 27, 2012.
ST Microelectronics, "S-Touch Sensors", http://www.st.com/internet/analog/class/1658.jsp, Jun. 27, 2012.
International Search Report for International Application No. PCT/US2012/0527061 dated Nov. 6, 2012; 2 pages.

(Continued)

*Primary Examiner* — Dennis Joseph
(74) *Attorney, Agent, or Firm* — Morgan, Lewis & Bockius LLP (57) ABSTRACT

An apparatus may include an internal charge pump within an integrated circuit package, an external pin positioned at an exterior of the integrated circuit package, and a select circuit configured to operate independently from the internal charge pump and located within the integrated circuit package, wherein the select circuit is configurable to selectively couple at least one of the internal charge pump and the external pin to a transmit (TX) sensor electrode.

20 Claims, 4 Drawing Sheets

(56) References Cited

U.S. PATENT DOCUMENTS

2011/0025635 A1   2/2011  Lee
2011/0300908 A1  12/2011  Grespan et al.
2012/0092288 A1   4/2012  Wadia
2012/0182251 A1*  7/2012  Krah ............................ 345/174

OTHER PUBLICATIONS

Written Opinion of the International Searching Authority for International Application No. PCT/US2012/052706 mailed Nov. 6, 2012; 6 pages.

* cited by examiner

TOUCH SENSOR DRIVER WITH SELECTABLE CHARGE SOURCE

RELATED APPLICATIONS

This application claims priority to U.S. Provisional Application No. 61/612,166, filed on Mar. 16, 2012, which is hereby incorporated by reference.

TECHNICAL FIELD

This disclosure relates to the field of touch-sensors and, in particular, to touch-sensor drivers.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates X/Y movement using a collection of capacitive sensor electrodes, arranged along two defined axes, that detect the presence or proximity of one or more conductive objects, such as a finger. Mouse right/left button clicks can be replicated by two mechanical or capacitive-sensed buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for determining movement of the conductive object in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch windows, touch panels, or touchscreen panels, are transparent display overlays which are typically either pressure-sensitive (resistive or piezoelectric), electrically-sensitive (capacitive), acoustically-sensitive (surface acoustic wave (SAW)), or photo-sensitive (infra-red). Such overlays allow a display to be used as an input device, removing the keyboard and/or the mouse as the primary input device for interacting with the displayed image's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touch screen, to select an item from a menu.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

In one embodiment, a capacitive touch sensing system may include a touch-sensor controller that stimulates and senses a response from an array of sensor electrodes in a touch-sensing surface, such as a touch panel. In one embodiment, a driver system may generate a stimulus signal, or a transmit ("TX") signal that may be applied to one or more of a set of transmit sensor electrodes. In one embodiment, the TX signal may be a signal such as a sine wave, square wave, or other waveform. The TX signal may induce a receive ("RX") signal in one or more RX sensor electrodes through capacitive coupling between the one or more RX sensor electrodes and the sensor electrode to which the TX signal is applied. The RX signal induced in each RX electrode may then be measured by a capacitance sensor to determine information such as the locations of objects proximate to the touch-sensing surface.

In one embodiment, the TX sensor electrodes may be stimulated using a TX signal having a large amplitude to induce a correspondingly large RX signal that is more easily measured or distinguished from noise. Additionally, the TX signal may be a high-frequency signal to reduce the amount of time used to perform the sensing operation, or to allow operation in a noise-free frequency band.

In one embodiment, a high-frequency TX signal having a high signal amplitude may be generated using a TX driver powered by a high voltage supply. This high voltage supply may be capable of providing sufficient power to the TX driver to drive the capacitive load presented by a TX sensor electrode at the target high frequency and high amplitude. In one embodiment, the high voltage supply for such a TX driver may be selectively sourced from an external charge source, such as an external charge pump or power supply, or from an internal charge pump or power supply. In one embodiment, the operation with an internal supply may be enhanced through use of an external reservoir capacitor to augment the capability of one or more TX drivers to supply charge to their associated TX sensor electrodes.

In one embodiment, a touch-sensor controller may be constructed in an integrated circuit, which may be contained within a single integrated circuit device package. A TX driver circuit which is part of such a touch-sensor controller may be powered by one or more internal charge sources within the integrated circuit package. A select circuit may also be included within the integrated circuit package, and may be used to selectively connect one or more of the internal charge sources with one or more of a number of TX driver circuits within the touch-sensor controller.

The select circuit may also selectively connect an external pin to the internal TX driver high voltage supply node. In one embodiment, the external pin may be located at an exterior surface of the integrated circuit package. In a first configuration of the TX driver high voltage supply where no external charge source or capacitor is connected to the external pin, the TX drivers may be powered by, and associated TX sensor electrodes may be charged using, an internal charge pump that is connected to the TX driver high voltage supply by the select circuit.

In a second configuration, the external pin may be connected to an external capacitor. In one embodiment, the external capacitor may function as a reservoir capacitor configured to store charge from the internal charge pump. The external capacitor may thus increase the drive capability of the internal charge pump by allowing the pump to continue operating at full capacity even when any driven TX sensor electrodes have been charged to their target level. In this configuration, the select circuit may be configured to connect both of the internal charge pump and the external capacitor to power the TX driver circuits.

In a third configuration, the external pin may be connected to an external power supply, such as a charge pump, switch mode pump, buck regulator, or other supply type. In one embodiment, the external power supply may generate a voltage higher than the voltage generated by the internal charge pump. In one embodiment, the external power supply may provide more charge than the internal charge pump is capable of. In one embodiment, the external power supply may provide charge at an efficiency greater than that of the internal charge pump. In this configuration, the select circuit may be configured to connect the external power supply to the TX driver circuits.

Figure 1:
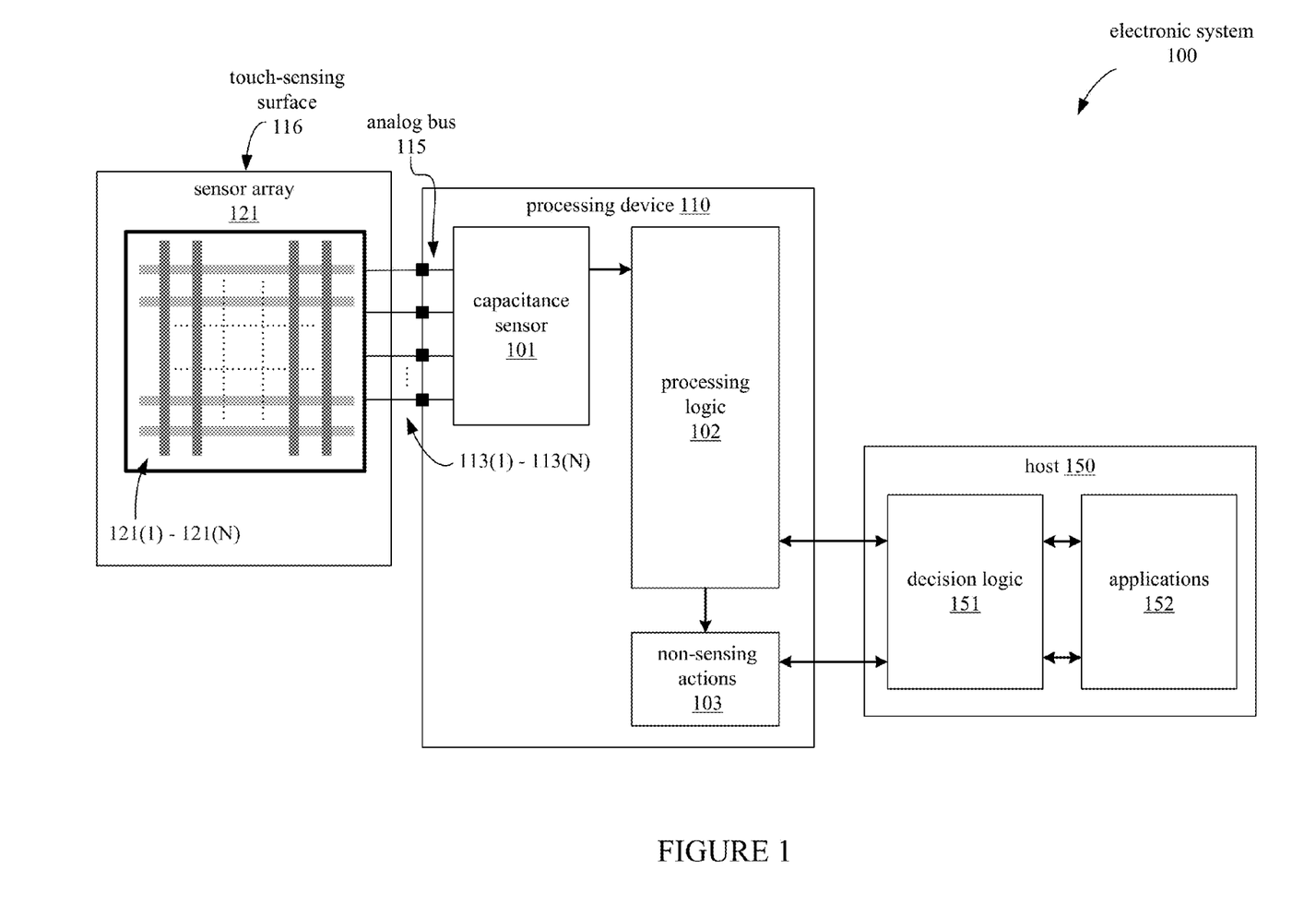
FIG. 1 is a block diagram illustrating an embodiment of an electronic system that processes touch-sensor data.

FIG. 1 illustrates a block diagram of one embodiment of an electronic system 100 including a capacitive sensor 101 that may utilize a TX driver circuit that includes a select circuit, internal charge pump, and external pin. In one embodiment, a multiplexer circuit may be used to connect the capacitive sensor 101 with a sensor array 121. The electronic system 100 includes a touch-sensing surface 116 (e.g., a touchscreen, or a touch pad) coupled to the processing device 110, which is coupled to a host 150. In one embodiment, the touch-sensing surface 116 is a two-dimensional user interface that uses a sensor array 121 to detect touches on the touch-sensing surface 116.

In one embodiment, the sensor array 121 includes sensor electrodes 121(1)-121(N) (where N is a positive integer) that are disposed as a two-dimensional matrix (also referred to as an XY matrix). The sensor array 121 is coupled to pins 113(1)-113(N) of the processing device 110 via one or more analog buses 115 transporting multiple signals. In an alternative embodiment without an analog bus, each pin may instead be connected either to a circuit that generates a TX signal or to an individual RX sensor circuit.

In one embodiment, the capacitance sensor 101 may include a relaxation oscillator or other means to convert a capacitance into a measured value. The capacitance sensor 101 may also include a counter or timer to measure the oscillator output. The processing device 110 may further include software components to convert the count value (e.g., capacitance value) into a touch detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output (i.e., density domain), instead of the raw counts being over or under a certain threshold.

In one embodiment, the processing device 110 further includes processing logic 102. Operations of the processing logic 102 may be implemented in firmware; alternatively, it may be implemented in hardware or software. The processing logic 102 may receive signals from the capacitance sensor 101, and determine the state of the sensor array 121, such as whether an object (e.g., a finger) is detected on or in proximity to the sensor array 121 (e.g., determining the presence of the object), resolve where the object is on the sensor array (e.g., determining the location of the object), tracking the motion of the object, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be a Programmable System on a Chip (PSoC®) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

In one embodiment, the electronic system 100 is implemented in a device that includes the touch-sensing surface 116 as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2:
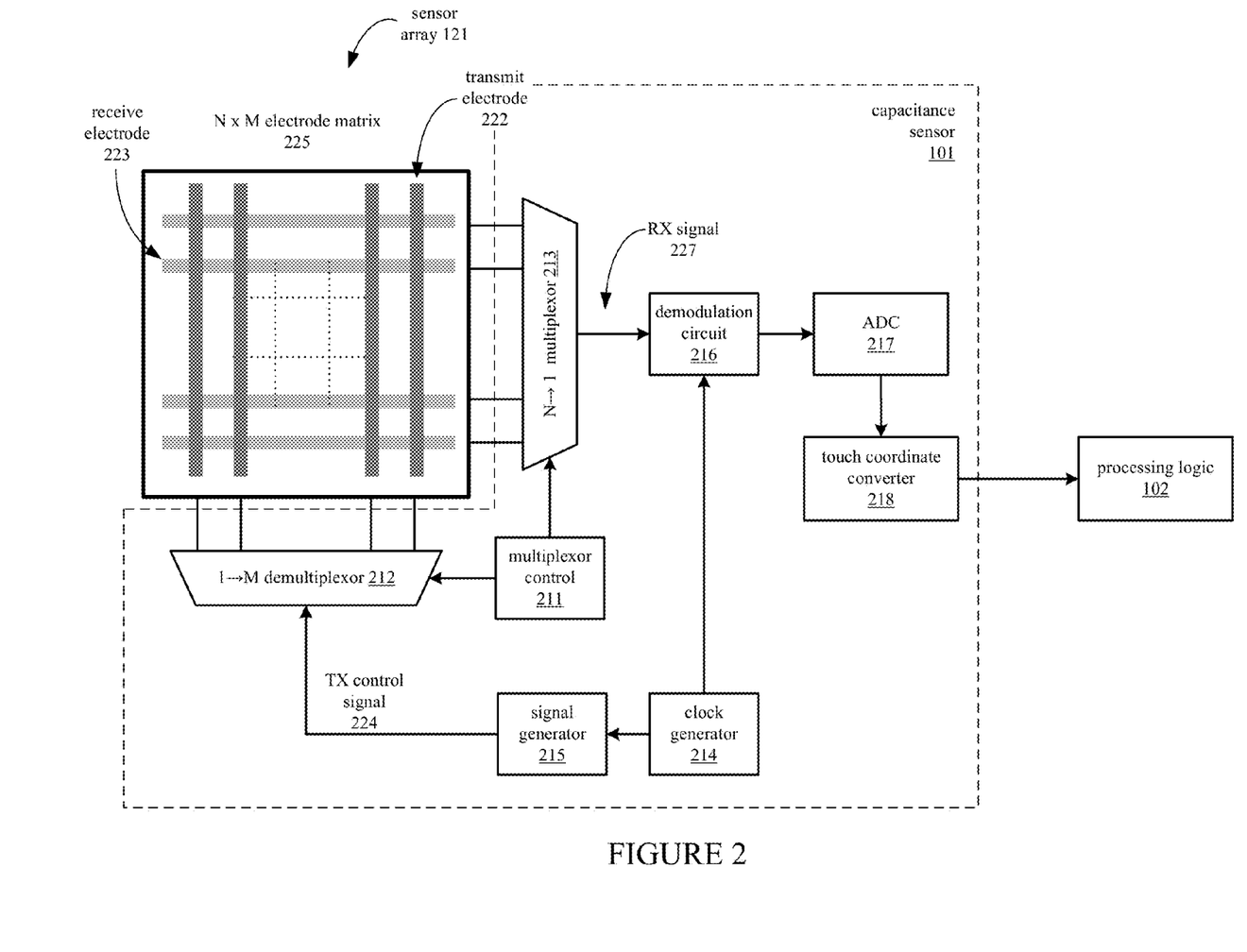
FIG. 2 is a block diagram illustrating an embodiment of an electronic system that processes touch-sensor data.

FIG. 2 is a block diagram illustrating one embodiment of an array of capacitive touch-sensor electrodes 121 and a capacitance sensor 101 that converts changes in measured capacitances to coordinates indicating the presence and location of touch. In one embodiment, the capacitance sensor 101 may measure mutual capacitances for intersections between the sensor electrodes in the sensor array 121. The touch coordinates are calculated based on changes in the measured capacitances relative to the capacitances of the same touch sensor array 121 in an un-touched state. In one embodiment, sensor array 121 and capacitance sensor 101 are implemented in a system such as electronic system 100. Sensor array 121 includes a matrix 225 of N×M electrodes (N receive electrodes and M transmit electrodes), which further includes transmit (TX) electrode 222 and receive (RX) electrode 223. Each of the electrodes in matrix 225 is connected with capacitance sensing circuit 101 through demultiplexer 212 and multiplexer 213.

Capacitance sensor 101 includes multiplexer control 211, demultiplexer 212 and multiplexer 213, clock generator 214, signal generator 215, demodulation circuit 216, and analog to digital converter (ADC) 217. ADC 217 is further coupled with touch coordinate converter 218. Touch coordinate converter 218 may be implemented in the processing logic 102.

The transmit and receive electrodes in the electrode matrix 225 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 overlap.

Clock generator 214 supplies a clock signal to signal generator 215, which produces a TX control signal 224 to be supplied to the transmit electrodes of touch sensor 121. In one embodiment, TX control signal 224 provides a control signal to multiple TX drivers which provide an alternate signal, such as a high voltage waveform, to the transmit electrodes of touch sensor 121. In one embodiment, the signal generator 215 includes a set of switches that operate according to the clock signal from clock generator 214. The switches may generate a TX control signal 224 by periodically connecting the output of signal generator 215 to a first voltage and then to a second voltage, wherein said first and second voltages are different.

The output of signal generator 215 is connected with demultiplexer 212, which allows the TX control signal 224 to be applied to any of the M transmit electrodes of touch sensor 121. In one embodiment, the output of signal generator 215 is connected with demultiplexer 212, which allows the TX control signal 224 to be applied to a control input of any of the TX drivers, which in turn may apply a modified form of TX control signal 224 to any of the M transmit electrodes of touch sensor 121. In one embodiment, multiplexer control 211 controls demultiplexer 212 so that the TX control signal 224 is applied to each transmit driver or transmit electrode 222 in a controlled sequence. Demultiplexer 212 may also be used to ground, float, or connect an alternate signal to the other transmit electrodes to which the TX control signal 224 is not currently being applied. In an alternate embodiment the TX control signal 224 may be presented in a true form to a subset of the transmit electrodes 222 and in complement form to a second subset of the transmit electrodes 222, wherein there is no overlap in members of the first and second subset of transmit electrodes 222.

Because of the capacitive coupling between the transmit and receive electrodes, the TX control signal 224 applied to each transmit electrode induces a current within each of the receive electrodes. For instance, when the TX control signal 224 is applied to transmit electrode 222 through demultiplexer 212, the TX control signal 224 induces an RX signal 227 on the receive electrodes in matrix 225. The RX signal 227 on each of the receive electrodes can then be measured in sequence by using multiplexer 213 to connect each of the N receive electrodes to demodulation circuit 216 in sequence.

The mutual capacitance associated with each intersection between a TX electrode and an RX electrode can be measured by selecting every combination of TX electrode and an RX electrode using demultiplexer 212 and multiplexer 213. To improve performance, multiplexer 213 may also be segmented to allow more than one of the receive electrodes in matrix 225 to be routed to additional demodulation circuits 216. In an optimized configuration, wherein there is a 1-to-1 correspondence of instances of demodulation circuit 216 with receive electrodes, multiplexer 213 may not be present in the system.

When a conductive object, such as a finger, approaches the electrode matrix 225, the object causes a decrease in the measured mutual capacitance between only some of the electrodes. For example, if a finger is placed near the intersection of transmit electrode 222 and receive electrode 223, the presence of the finger will decrease the charge coupled between electrodes 222 and 223. Thus, the location of the finger on the touchpad can be determined by identifying the one or more receive electrodes having a decrease in measured mutual capacitance in addition to identifying the transmit electrode to which the TX control signal 224 was applied at the time the decrease in capacitance was measured on the one or more receive electrodes.

By determining changes in the mutual capacitances associated with each intersection of electrodes in the matrix 225, the presence and locations of one or more conductive objects may be determined. The determination may be sequential, in parallel, or may occur more frequently at commonly used electrodes.

In alternative embodiments, other methods for detecting the presence of a finger or other conductive object may be used where the finger or conductive object causes an increase in measured capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined based on the locations of one or more electrodes at which a change in measured capacitance is detected, and the associated magnitude of capacitance change at each respective electrode.

The current induced as RX signal 227 is integrated by demodulation circuit 216. The current output by demodulation circuit 216 can then be filtered and converted to a digital code by ADC 217.

A series of such digital codes measured from adjacent sensor intersections, when compared to or offset by the associated codes of these same sensors in an un-touched state, may be converted to touch coordinates indicating a position of a conductive object on touch sensor array 121 by touch coordinate converter 218. The touch coordinates may then be used to detect gestures or perform other functions by the processing logic 102, or be passed to host 150.

Figure 3:
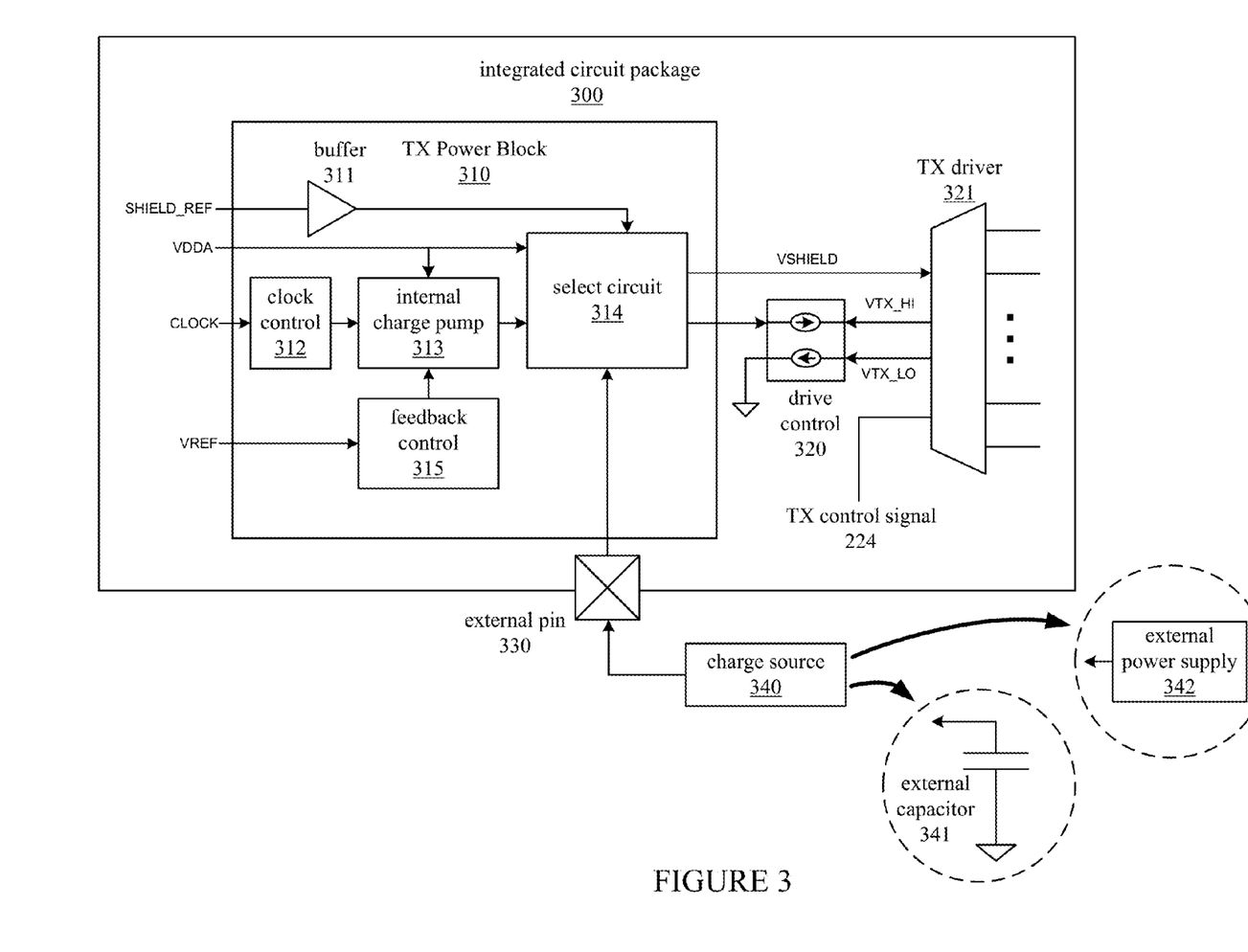
FIG. 3 illustrates an embodiment of a circuit for driving a transmit (TX) sensor electrode.

FIG. 3 illustrates an embodiment of a TX driver system contained within an integrated circuit package 300. In one embodiment, the TX driver system may be implemented using TX power block 310, drive control 320, and external pin 330.

In one embodiment, the TX power block 310 may include an internal charge pump 313 that is also contained within the integrated circuit package, and an external pin 330 connected to an exterior pin of the integrated circuit package 300. For example, the external pin 330 may be made from conductive material (e.g., metal) that is accessible from the outside of the integrated circuit package 300.

The TX power block 310 may further include a select circuit 314, to which the internal charge pump 313 and the external pin 330 are connected. In one embodiment, the select circuit 314 is configurable to selectively couple at least one of the internal charge pump 313 and the external pin 330 to a TX sensor electrode through a TX driver. In one embodiment, the select circuit is configurable to selectively couple only one of the internal charge pump 313 and the external pin 330 to a TX sensor electrode, or both of the internal charge pump 313 and the external pin 330 to the TX sensor electrode.

For example, the select circuit 314 may be configured to connect one or both of the internal charge pump 313 and the external pin 330 through drive control 320, to TX driver circuit 321, and ultimately to an array of sensor electrodes, such as sensor array 121 illustrated in FIG. 2.

In one embodiment, the select circuit 314 may be configured to operate independently from the internal charge pump 313. In other words, the select circuit 314 is distinct from any switching circuitry that may function as part of the internal charge pump 313 that allows the internal charge pump 313 to function normally.

In one embodiment, the driver control circuit 320 is used to limit the amount of outrush and inrush current to and from the TX sensor electrodes. In one embodiment, the TX driver circuit 321 may contain one TX driver that is switched to one or more TX sensor electrodes. In an alternate embodiment TX driver circuit 321 may contain a separate TX driver for each sensor electrode in sensor array 121. In one embodiment, the TX driver circuit 321 may be used to selectively connect the VTX_HI and VTX_LO signals generated by the TX power block with individual TX sensor electrodes according to a sequence. In one embodiment this sequence follows the TX control signal 224 so as to present a TX signal onto the enabled TX sensor electrodes. For example, during a scan of the touch-sensing surface, the TX driver circuit 321 may alternately apply the VTX_HI and VTX_LO voltages from the drive control circuit 320, following the TX control signal 224, to each TX sensor electrode from the set of TX sensor electrodes in sensor array 121.

In one embodiment, the TX driver circuit 321 applies the TX signal to only one TX sensor element at a time; alternatively, the TX driver circuit 321 may apply the TX signal to multiple TX sensor elements, simultaneously. In one embodiment the TX driver circuit 321 applies the TX signal in true form to multiple TX sensor elements, and also applies the TX signal in complement form to multiple other TX sensor elements, simultaneously. In one embodiment, the TX signal driven onto a single TX sensor electrode may vary between VTX_HI and VTX_LO. In one embodiment, the TX driver circuit 321 may be contained within the integrated circuit package 300. In an alternative embodiment, the TX driver circuit 321 may be outside the integrated circuit package 300.

In one embodiment, the select circuit 314 may be configured based on a configuration value that is stored in a memory. For example, such a configuration value may indicate which of the charge sources, such as the internal charge pump 313, a supply voltage VDDA, and external pin 330 are to be connected to the TX sensor electrodes through the drive control current limiters 320 and TX driver circuit 321. The SHIELD_REF voltage may be buffered by buffer 311, and the resulting voltage VSHIELD may also be routed to TX driver circuit 321 by the select circuit 314. In one embodiment the TX driver circuit 321 may selectively apply the VSHIELD signal to specified electrodes in the sensor array 121 while simultaneously applying the TX signal to alternate electrodes in the same sensor array. Thus, the select circuit 314 may be used to select one or more of the charge sources to be used for generating the VTX_HI signal, which may in turn be used to generate the final TX signal that is applied to the TX sensor electrodes.

In one embodiment, the internal charge pump 313 may operate to supply a programmable voltage to the select circuit 314. For example, the charge pump 313 may supply up to 10 volts to the select circuit 314. In one embodiment, the internal charge pump 313 may generate its output voltage from a lower internal voltage that is supplied to the charge pump 313. For example, the charge pump 313 may generate a 10 volt output from a 2.8 volt supply voltage VDDA.

In one embodiment, the charge pump 313 is programmable to output a specific voltage level. In one embodiment, the TX power block 310 may also include a feedback control 315 circuit that may scale or otherwise process feedback for the internal charge pump 313, and a clock control 312 to control the CLOCK signal for operating the charge pump 313.

In one embodiment, the external pin 330 may be used for connecting an external charge source 340 with the TX power block 310 within the integrated circuit package 300. The external charge source 340 may be, for example, an external capacitor 341, or an external power supply 342.

In one embodiment, the TX power block 310 within the integrated circuit package 300 may be configured to use an external capacitor 341 that is connected to the external pin 330. In this configuration, the select circuit 314 connects the internal charge pump 313 and the external pin 330 to the drive control circuit 320, such that the internal charge pump 313 can direct charge not needed by the TX electrodes to the external capacitor 341. The combination of the charge pump 313 and the external capacitor 341 may then be used to supply the VTX_HI voltage that is ultimately used to generate the signal presented to the TX sensor electrode.

In one embodiment, the external capacitor 341 functions independently from the internal charge pump 313. In other words, the external capacitor 341 is distinct from any capacitor that may function as part of the internal charge pump 313 that allows the internal charge pump 313 to function normally.

In one embodiment, the external capacitor may have a capacitance of a few tens of nanofarads to a few hundred nanofarads, and may function as a charge reservoir for the charge pump 313. Thus, charge stored in the external capacitor 330 may be supplied to charge the TX sensor electrode when a current is drawn from the TX system, such as when a TX pulse is asserted at the TX sensor electrode via the TX driver circuit 321. For instance, when a TX pulse is asserted to the sensor panel, a current pulse may flow into the TX sensor electrode for a short period, such as a fraction of a microsecond, before decaying in magnitude as the TX electrode is charged. In one embodiment where the charge pump 313 lacks sufficient capacity to deliver sufficient charge in such a short period of time, the external capacitor 341 may supply the additional charge.

The process moderates the peak current that the charger pump 313 must deliver by allowing the charge pump 313 to recharge the external capacitor 341 when no current is being demanded from the TX power block 310. The external capacitor 341 thus either allows for a higher peak current to flow to the one or more TX sensor electrodes than would otherwise be possible by using only the charge pump 313, or allows for a smaller charge pump to generate the same peak current flow. In one embodiment, when the select circuit 314 combines the capabilities of the internal charge pump 313 with the charge stored on the external capacitor 314, the resulting average and peak output currents may be increased by a factor of 2 or 3.

In one embodiment, the TX power block may provide for turning off of VDDA for periods of time for power savings or other reasons. In one embodiment, if an external capacitor 341 is connected to the external pin 330 when VDDA is turned off, the select circuit 314 limits the rate of discharge of the external capacitor 341 so that the VTX_HI supply voltage does not decay substantially while VDDA is turned off. In one embodiment, the voltage at the external capacitor 341 may be monitored and the internal charge pump 313 may operate to restore the voltage at the external capacitor 341 if the voltage falls below a threshold.

In one embodiment, an alternate configuration may be used where an external power supply 342 is coupled with the external pin 330. In this configuration, the select circuit 314 may be configured to connect the external pin 330 to the drive control block 320 so that the external power supply 342 can supply charge to the TX driver circuit 321 and sensor electrodes in sensor array 121.

In one embodiment, when the external power supply 342 is being used, the internal charge pump 313 may be turned off, and the select circuit 314 may route power only from the external pin 330 to the TX driver circuit 321. In one embodiment, the voltage generated by the external power supply 342 may be higher than the supply voltage VDDA.

In one embodiment, the external power supply 342 may be implemented using a special chip, such as a power management integrated circuit (PMIC) or a special-purpose regulator chip, which may be capable of delivering an elevated voltage with current capacity that is greater than the current capacity that can be achieved by an internal charge pump 313 contained within the integrated circuit package 300.

In addition to being supplied to the charge pump 313, the internal voltage VDDA may, in an embodiment, also be connected to the select circuit 314 such that the select circuit 314 is configurable to selectively connect at least one of VDDA, the internal charge pump 313, and the external pin 330 to the TX drivers and sensor electrodes through drive control 320.

In one embodiment, the TX power block 310 may include one or more additional internal voltage sources connected to the select circuit 314, such that the select circuit 314 may be configured to selectively connect at least one of the additional internal voltage sources to the TX sensor electrodes.

In one embodiment, the VDDA voltage may be one of such sources that may be used for generating the TX signal. In particular, the VDDA voltage may be useful if it is high enough and has sufficiently low noise characteristics.

In one embodiment, the VDDA voltage may be 3.3 volts or 5 volts. In one embodiment, VDDA may be internally connected to the select circuit 314 via a conductive path within the integrated circuit package 300. In an alternative embodiment, VDDA may be connected to the select circuit 314 through the external pin 330.

In one embodiment, the TX power block 310 may also include one or more additional voltage sources that may be selected by the select circuit 314 instead of the charge pump 313, VDDA, or the external pin 330. For example, a SHIELD_REF voltage may also be selectable by the select circuit 313. Thus, the select circuit 314 may be configurable to selectively connect at least one of the SHIELD_REF, VDDA, the internal charge pump 313, and the external pin 330 to the TX driver circuit 321. In one embodiment, the SHIELD_REF voltage may be buffered by buffer 311.

Figure 4:
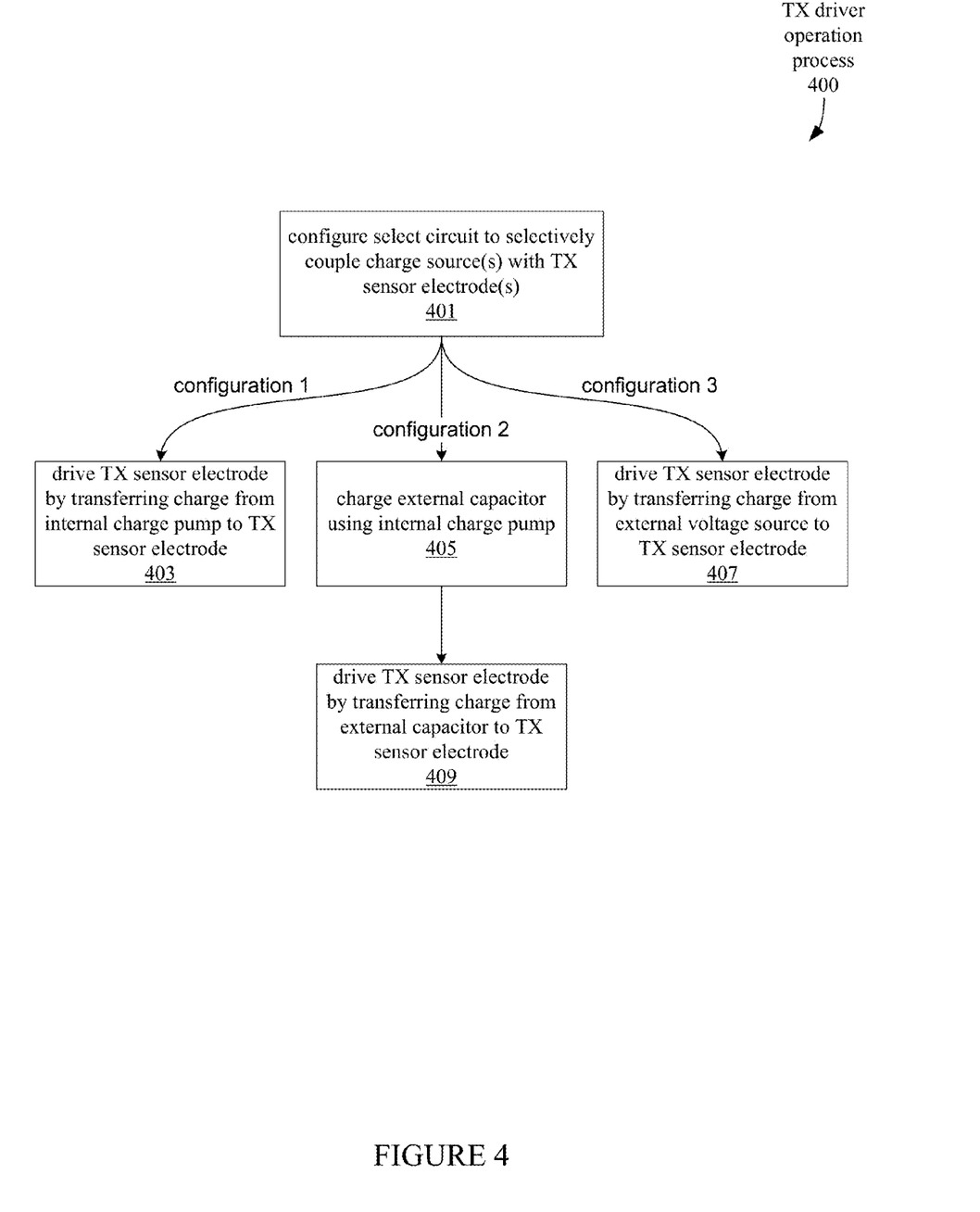
FIG. 4 is a flow diagram illustrating a process for driving a TX sensor electrode, according to an embodiment.

FIG. 4 illustrates a process 400 for operating a TX driver system such as the TX driver system illustrated in FIG. 3, according to an embodiment.

TX driver operating process 400 begins at block 401, where the select circuit 314 is configured to selectively couple one or more charge sources with the drive control circuit, and ultimately, with one or more TX drivers and associated sensor electrodes. In one embodiment, the charge sources may include the internal charge pump 313 and the external pin 330 which may be connected to an external power supply 342 or an external capacitor 341. The TX driver operation process may drive the TX sensor electrode by transferring charge from the one or more charge sources to the TX sensor electrode.

In a first configuration (configuration 1), the external pin 330 may be left unconnected to any external charge source, while the select circuit 314 is configured at block 401 to connect the internal charge pump 313 (or one of the other internal voltage sources) to the drive control circuit 320, and ultimately to a TX sensor electrode.

In this configuration, the process 400 may continue from block 401 to block 403, where the TX power block 310 supplies power to the TX driver circuit 321, which drives a TX sensor electrode by transferring charge from the internal charge pump 313 to the TX sensor electrode through the drive control circuit 320. Alternatively, one of the other internal voltage sources, such as VDDA or SHIELD_REF, may be used instead of the internal charge pump 313.

In a second configuration (configuration 2), the external pin 330 may be connected to an external capacitor 341 while the select circuit 314 is configured at block 401 to connect both the internal charge pump 313 and the external pin 330 to the drive control circuit 320, and ultimately to the enabled TX drivers and sensor electrodes.

In this configuration, the process 400 continues from block 401 to block 405. At block 405, the TX power block may use the internal charge pump 313 to charge the external capacitor 341. In one embodiment, this may occur when the VTX_LO signal is being asserted at the TX sensor electrode, such that current is not being drawn from the TX power block 310. In one embodiment this may also occur during the latter portion of when the VTX_HI signal is asserted at the TX sensor electrode, when the full capacity of the charge pump 313 is not being used to deliver charge to the enabled TX electrodes. When current is not being drawn, charge generated by the charge pump 313 may be stored in the capacitor 341 instead of being used to drive a higher voltage VTX_HI signal at the TX sensor electrode.

From block 405, the process 400 continues at block 409. At block 409, the TX power block 310 may drive the TX sensor electrode with a VTX_HI signal by transferring charge from at least the external capacitor 341 to the TX sensor electrode. In one embodiment, the external capacitor 341 may be used to augment the current capacity of the internal charge pump 313 such that a higher VTX_HI current can be sourced.

In a third configuration (configuration 3), the external pin 330 may be connected to an external power supply 342 while the select circuit 314 is configured at block 401 to connect the external pin 330 to the drive control circuit 320, and ultimately to a TX sensor electrode.

In this configuration, the process 400 continues from block 401 to block 407. At block 407, the TX block may use the external power supply 342 to supply the current when VTX_HI is being applied to the one or more TX sensor electrodes. Specifically, the select circuit 314 transfers charge from the external power supply 342 via the external pin 330, through the drive control circuit 320 and TX driver circuit 321, and ultimately to the TX sensor electrodes.

Thus, in one embodiment, a TX driver system as described above may be provided in a single integrated circuit package and may allow a touch-panel designer to select one of many possible configurations, depending on desired current capacity, available space for the design, power consumption considerations, and other factors.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus, comprising:
an internal charge pump within an integrated circuit package;
an external pin positioned at an exterior of the integrated circuit package; and
a select circuit configured to operate independently from the internal charge pump and located within the integrated circuit package, wherein in a first configuration, the select circuit is configured to couple the internal charge pump to a transmit (TX) sensor electrode and the internal charge pump is configured to charge the TX sensor electrode, wherein in a second configuration, the select circuit is configured to simultaneously couple both of the internal charge pump and the external pin to the TX sensor electrode to conduct charge from the internal charge pump to the external pin and from the external pin to the TX sensor electrode, and wherein in a third configuration, the select circuit is configured to couple the external pin to the TX sensor electrode and disconnect the internal charge pump from the TX sensor electrode, and the external pin is configured to conduct charge from outside the integrated circuit package to inside the integrated circuit package.

2. The apparatus of claim 1, wherein the select circuit is configurable to selectively couple only one of the internal charge pump and the external pin to a transmit sensor electrode, or both of the internal charge pump and the external pin to the TX sensor electrode.

3. The apparatus of claim 2, wherein the charge pump is configured to charge an external capacitor connected to the external pin when the select circuit is configured to couple both of the internal charge pump and the external pin to the TX sensor electrode.

4. The apparatus of claim 3, wherein the select circuit is configured to transfer charge from the external capacitor to the TX sensor electrode when the select circuit is configured to couple both of the charge pump and the external pin to the TX sensor electrode.

5. The apparatus of claim 1, further comprising an external charge source coupled with the external pin, wherein the external charge source is configured to supply charge to the TX sensor electrode when the select circuit is configured to couple the external pin to the TX sensor electrode.

6. The apparatus of claim 1, further comprising a transmit (TX) demultiplexer coupled with the select circuit, wherein the TX demultiplexer is configured to selectively connect the select circuit with one of a plurality of TX sensor electrodes.

7. The apparatus of claim 6, wherein the TX demultiplexer is contained within the integrated circuit package.

8. The apparatus of claim 1, further comprising one or more internal voltage sources coupled with the select circuit, wherein the select circuit is further configurable to selectively connect at least one of the one or more internal voltage sources with the TX sensor electrode.

9. The apparatus of claim 1, wherein the select circuit is configurable based on a configuration value of the select circuit stored in a memory.

10. A mutual capacitance sensing circuit, comprising:
    an array of sensor electrodes including a transmit (TX) sensor electrode;
    a charge pump; and
    a select circuit located within an integrated circuit package and coupled with the TX sensor electrode, wherein the select circuit is configurable according to a first configuration to enable the charge pump to charge the TX sensor electrode, configurable according to a second configuration to simultaneously couple both of the charge pump and an external pin of the integrated circuit package to the TX sensor electrode to conduct charge from the charge pump to the external pin and from the external pin to the TX sensor electrode, and configurable according to a third configuration to couple the external pin to the TX sensor electrode and disconnect the charge pump from the TX sensor electrode, wherein the external pin is configured to conduct charge from outside the integrated circuit package to inside the integrated circuit package when the select circuit is in the third configuration.

11. The mutual capacitance sensing circuit of claim 10, wherein the charge pump and the select circuit are contained within an integrated circuit package, and wherein the external pin is positioned at an exterior surface of the integrated circuit package.

12. The mutual capacitance sensing circuit of claim 10, wherein the charge pump is configured to charge an external capacitor connected to the external pin when the select circuit is configured to connect both of the charge pump and the external pin to the TX sensor electrode.

13. The mutual capacitance sensing circuit of claim 12, wherein the select circuit is configured to transfer charge from the external capacitor to the TX sensor electrode when the select circuit is configured to couple both of the charge pump and the external pin to the TX sensor electrode based on the configuration of the select circuit.

14. The mutual capacitance sensing circuit of claim 10, further comprising an external charge source coupled with the external pin, wherein the external charge source is configured to supply charge to the TX sensor electrode when the select circuit is configured to connect the external pin to the TX sensor electrode.

15. The mutual capacitance sensing circuit of claim 10, further comprising a transmit (TX) demultiplexer coupled with the select circuit, wherein the TX demultiplexer is configured to selectively connect the select circuit with one of a plurality of TX sensor electrodes.

16. The mutual capacitance sensing circuit of claim 10, further comprising one or more internal voltage sources coupled with the select circuit, wherein the select circuit is further configurable to selectively connect at least one of the one or more internal voltage sources with the TX sensor electrode.

17. A method, comprising:
    configuring a select circuit according to one of at least three possible configurations capable of being implemented by the select circuit to:
        couple an internal charge pump to a transmit (TX) sensor electrode according to a first configuration of the three possible configurations to enable the charge pump to charge the TX sensor electrode,
        simultaneously couple both of the internal charge pump and an external pin to the TX sensor electrode according to a second configuration of the three possible configurations to conduct charge from the charge pump to the external pin and from the external pin to the TX sensor electrode, or
        couple the external pin to the TX sensor electrode and disconnect the internal charge pump from the TX sensor electrode according to a third configuration of the three possible configurations, wherein the internal charge pump is located within a device package, wherein the select circuit is configured to operate independently from the internal charge pump, wherein the external pin is located at an exterior surface of the device package, and wherein the external pin is configured to conduct charge from outside the device package to inside the device package when the select circuit is in the third configuration; and
    driving the TX sensor electrode by transferring charge from the one of the internal charge pump and the external pin to the TX sensor electrode.

18. The method of claim 17, wherein transferring the charge further comprises transferring the charge to the TX sensor electrode from an external capacitor coupled with the external pin.

19. The method of claim 18, further comprising charging the external capacitor using the internal charge pump.

20. The method of claim 17, wherein transferring the charge further comprises transferring the charge to the TX sensor electrode from an external charge source coupled with the external pin.

* * * * *